(12) United States Patent
Dale

(10) Patent No.: US 10,899,550 B2
(45) Date of Patent: Jan. 26, 2021

(54) POSITIVE DRIVE CONVEYOR

(71) Applicant: Dale Holdings (Pty) Ltd, Cosmo (ZA)

(72) Inventor: Christopher Dale, Cosmo (ZA)

(73) Assignee: DALE HOLDINGS (PTY) LTD, Roodepoort (ZA)

( * ) Notice: Subject to any disclaimer, the term of this patent is extended or adjusted under 35 U.S.C. 154(b) by 0 days.

(21) Appl. No.: 16/449,365

(22) Filed: Jun. 22, 2019

(65) Prior Publication Data

US 2019/0389664 A1    Dec. 26, 2019

(30) Foreign Application Priority Data

Jun. 22, 2018  (ZA) .................. 2018/04180

(51) Int. Cl.
| | |
|---|---|
| *B65G 23/06* | (2006.01) |
| *B65G 33/34* | (2006.01) |
| *B65G 21/02* | (2006.01) |
| *B65G 33/02* | (2006.01) |

(52) U.S. Cl.
CPC ............. *B65G 33/34* (2013.01); *B65G 21/02* (2013.01); *B65G 33/02* (2013.01)

(58) Field of Classification Search
CPC ........ B65G 21/18; B65G 23/06; B65G 33/00; B65G 33/34; B65G 2207/24
USPC ......................................... 198/778, 834, 835
See application file for complete search history.

(56) References Cited

U.S. PATENT DOCUMENTS

| | | | | |
|---|---|---|---|---|
| 3,505,892 A | * | 4/1970 | Graham ................. | B65G 23/06 474/160 |
| 4,450,953 A | * | 5/1984 | Le Cann ................. | B65G 21/18 198/778 |
| 4,627,529 A | * | 12/1986 | Tarlton ................... | B65G 21/18 198/500 |
| 4,852,720 A | * | 8/1989 | Roinestad .............. | B65G 21/18 198/778 |
| 4,953,365 A | * | 9/1990 | Lang ....................... | A23L 3/361 198/778 |
| 5,191,267 A | * | 3/1993 | Machacek .............. | B65G 21/18 198/778 |
| 5,228,557 A | * | 7/1993 | Lago ....................... | B65G 21/18 198/778 |
| 6,938,754 B2 | * | 9/2005 | Kanaris ................. | B65G 39/073 198/494 |
| 8,181,771 B2 | * | 5/2012 | Talsma ................... | B65G 17/086 198/778 |
| 8,727,109 B2 | * | 5/2014 | Layne .................... | B65G 17/086 198/834 |
| 9,415,943 B2 | * | 8/2016 | Carrara .................. | B65G 45/10 |

(Continued)

*Primary Examiner* — Joseph A Dillon, Jr.
(74) *Attorney, Agent, or Firm* — Workman Nydegger

(57) ABSTRACT

The invention relates to a positive drive spiral conveyor which includes, a drive tower rotatable about a vertical axis and a plurality of drive members extending in length from a bottom to a top of the drive tower. The drive members are spaced radially around the drive tower, with each drive member having a projecting driving ridge extending in length along at least a section of each drive member with a projecting shaft positioned on each drive member proximate an end of the driving ridge thereby defining an engagement zone. The projecting shaft defines a guiding surface around the shaft, such that in use a positive drive protrusion of a conveyor belt engages the guiding surface of the projecting shaft and is guided towards a leading side of the driving ridge.

14 Claims, 6 Drawing Sheets

(56) References Cited

U.S. PATENT DOCUMENTS

| | | | | |
|---|---|---|---|---|
| 9,815,630 | B1* | 11/2017 | Coto | B65G 23/44 |
| 10,155,627 | B2* | 12/2018 | Chang | B65G 17/086 |
| 10,577,183 | B2* | 3/2020 | Perdue | B65G 17/064 |
| 2006/0252588 | A1* | 11/2006 | Fandella | F16H 55/12 |
| | | | | 474/47 |
| 2016/0304285 | A1* | 10/2016 | Eldor | B65G 21/18 |
| 2016/0368638 | A1* | 12/2016 | Zatterstrom | B65G 17/14 |
| 2017/0043958 | A1* | 2/2017 | Muchalov | B65G 23/16 |
| 2018/0170680 | A1* | 6/2018 | Chang | B65G 21/18 |
| 2018/0237227 | A1* | 8/2018 | Tamlin | B65G 27/12 |
| 2018/0290833 | A1* | 10/2018 | Neely | B65G 17/086 |
| 2019/0016535 | A1* | 1/2019 | Elsner | B65G 17/385 |
| 2019/0256294 | A1* | 8/2019 | Perdue | B65G 23/06 |
| 2019/0308816 | A1* | 10/2019 | Van Faassen | B65G 17/063 |
| 2019/0308817 | A1* | 10/2019 | Neely | B65G 17/086 |

\* cited by examiner

POSITIVE DRIVE CONVEYOR

CROSS REFERENCE TO RELATED APPLICATIONS

This application claims the benefit of South African Provisional Patent Application No. 2018/04810 filed on 22 Jun. 2018. The content of the above application is all incorporated by reference as it fully set forth herein in its entirety.

FIELD

This invention relates to a conveyor. In particular the invention relates to a positive drive conveyor and a drive member for use in such a positive drive conveyor.

BACKGROUND

Conveyor belts are often used to convey articles through heated or cooled environments. Spiral conveyors in which a rotating drum, which is centrally located in a spiral conveyor belt, is used to drive the spiral conveyor belt in heaters, coolers, freezers or dryers in order to provide a long conveying path while having a decreased footprint.

The conveyor belts which are used in spiral conveyors are constructed of interlinked belt rows which are placed adjacent one another and secured to one another with a belt rod. The interlinked belt rows are further capable of collapsing on an operative inside of the conveyor belt, located proximate the periphery of the rotating drum, in order to wrap around the drive drum which result in the conveyor belt to be driven by the drive drum.

With current spiral drive conveyors, the rotating drum is in the form of a smooth or open drum surface which includes drive bars or wear strips which are fixed on the outer periphery of the drum proximate the operative inside of the belt. In use, the drive drum's outer periphery moves past the inside edge of the belt with a higher rotational speed which creates friction, this causes the belt to be pushed along by the drive drum. The difference in rotational speed between the drive drum and the conveyor belt creates unwanted movement and/or vibration on the belt rows which induces movement of the conveyed articles and also over tensions the belt.

The inventor is aware of the problems in current spiral drive conveyor. These problems include the engagement between the drive drum and the conveyor belt due to the design of current drive members. The current invention aims to provide a solution to these problems.

SUMMARY

Broadly according a first aspect of the invention there is provided a positive drive spiral conveyor which includes;
    a drive tower rotatable about a vertical axis; and
    a plurality of drive members extending in length from a bottom to a top of the drive tower, the drive members spaced radially around the drive tower, each drive member having a projecting driving ridge extending in length along at least a section of each drive member with a projecting shaft positioned on each drive member proximate an end of the driving ridge thereby defining an engagement zone, the projecting shaft defining a guiding surface around the shaft, such that in use a positive drive protrusion of a conveyor belt engages the guiding surface of the projecting shaft and is guided towards a leading side of the driving ridge.

The driving ridge and the shaft may project outwardly from the drive member away from the drive tower to allow the positive drive protrusion of the conveyor belt to engage the projecting shaft before being guided towards a leading side of the driving ridge.

The engagement zone may be the area on the drive member where the positive drive protrusion first engages the drive tower.

The projecting shaft may be static or dynamic. In a preferred embodiment, the projecting shaft may be rigid and include a rolling element which is secured around the shaft. The rolling element may be in the form of a bearing, bush or the like shaped and dimensioned to fit onto the shaft. In a preferred embodiment, the rolling element may be in the form of a bearing which is co-axially seated on an end of the projecting shaft, such that friction between the projecting shaft and the positive drive protrusion of the conveyor belt is reduced when the positive drive protrusion engages the bearing and is guided towards the driving ridge.

With reference to an upward spiral conveyor, in which the conveyor belt engages the drive tower at a lower section and disengage the drive tower at an upper section, the projecting shaft may be positioned at the engagement zone which is located at the lower section of the drive tower, with the driving ridge extending from directly above the projecting shaft towards the upper section of the drive tower.

In a downward spiral conveyor, in which the conveyor belt engages the drive tower at the upper section and disengage the drive tower at the lower section, the shaft may be positioned at the engagement zone which is located at the upper section of the drive tower, with the driving ridge extending from directly below the shaft towards the lower section of the drive tower. In use, the positive drive protrusion which is located on an operative inside of the conveyor belt may engage the shaft, which allows the positive drive protrusion to be guided by the shaft towards either side of the driving ridge.

The bar caps may be of made from a metal, polymer, composite or the like.

The drive tower may include a central driven member, having a drum cage around it that rotates with the central driven member. The drum cage may be in the form of a framed drum structure, which includes a plurality of vertically extending radially spaced cage bars provided on the outer periphery of the drum cage.

The drive members may be in the form of one or more bar caps which are shaped and dimensioned to be secured to the cage bars. The bar caps may include a front planar face, from which the driving ridge and the shaft project substantially perpendicular away from the front face. The front planar face may be wider at the engagement zone of the cage bars to aid the positive drive protrusion to engage the projecting shaft. The bar caps may further include a rear section which defines a holding formation shaped and dimensioned to be received by the cage bars.

In one embodiment, each drive member may be in the form of a primary bar cap and a secondary bar cap, which are both attached to the same cage bar and are positioned adjacent to one another other. The secondary bar cap may include a driving ridge which extends along the length of a front face of the secondary bar cap. The primary bar cap may include a driving ridge which extends partially along a length of a front face of the primary bar cap. The driving ridge may extend from one end of the primary bar cap towards a projecting shaft. The position of the projecting shaft may define the engagement zone which is either directly above or below the end of the driving ridge depending on whether it is an upward or downward spiral conveyor. The secondary bar cap and primary bar cap may be attached to the cage bar above one another, such that the driving ridges of the secondary bar cap and the primary bar cap are contiguous.

In such an embodiment, in an upward spiral conveyor system, the secondary bar caps may be attachable over the upper section of each cage bar, and the primary bar caps attachable over the lower section of each cage bar with the projecting shaft positioned below a bottom end of the driving ridge. In a downward spiral conveyor system, the secondary bar caps may be attachable over the lower section of each cage bar, and the primary bar caps attachable over the upper section of each cage bar, with the projecting shaft positioned above an upper end the driving ridge.

The cage bars may be in the form of rectangular elongate members with the holding formation of each bar cap in the form of a lipped channel which in use allows the bar caps to slide over the cage bars.

In another embodiment of the invention the drive members may be in the form of folded sheet members. The folded sheet members may be folded to define the driving ridge and the outwardly projecting shaft may be secured to the folded sheet member at the engagement zone. The folded sheet members may be attached to the outer periphery of the drive tower at set distances from each other or adjacent one another in order to define an open or closed drive tower dependent on the airflow required.

In one embodiment, the outer periphery of the drive tower may be cylindrical. In another embodiment, the diameter of the outer periphery of the drive tower may be varied in different sections along its length. In yet another embodiment the outer periphery of the drive tower may be tapered throughout its length. In such an embodiment, the drive tower may be substantially cone shaped.

In an upward spiral conveyor, the drive tower may have a larger peripheral diameter at the lower section and taper towards a smaller peripheral diameter at the upper section, such as to resemble a cone. In a downward spiral conveyor, the drive tower may have a larger peripheral diameter at the upper section and taper towards a smaller peripheral diameter at the lower section, such as to resemble an inverted cone. In use, in a spiral conveyor system, the conveyor belt tangentially moves towards the drive tower and may engage the drive member either below or above the projecting shaft, for an upward or downward spiral conveyor respectively, allowing the conveyor belt to collapse on a larger diameter which in turn reduces the tension between each conveyor belt row. The conveyor belt thereafter moves towards the guiding surface of the projecting shaft with the reduced tension between each conveyor belt row allowing the conveyor belt rows to move respective of each other which aids in the belt either being guided towards the leading side of the driving ridge such that it is driven by the drive tower, or is guided towards a trailing side of the driving ridge where it does not engage the driving ridge.

In another embodiment, the outer periphery of the drive tower may be cylindrical, and the height of the driving ridges may be varied in different sections along its length. In yet another embodiment the height of the driving ridges may be varied throughout its length.

In accordance with another aspect of the invention there is provided a positive drive spiral conveyor system which includes
    a drive tower rotatable about a vertical axis;
    a plurality of drive members extending in length from a top to a bottom of the drive tower, the drive members spaced radially around the drive tower, each drive member having a projecting driving ridge extending in length along at least a section of each drive member with a projecting shaft positioned on each drive member proximate an end of the driving ridge thereby defining an engagement zone, the projecting shaft defining a guiding surface around the shaft; and
    a conveyor belt advancing up or down along a helical path around the outer periphery of the rotatable drive tower, the conveyor belt includes a plurality of rows of belt modules having an inside edge and an outer edge, the inner edge is at an operative inside of the helical path, the inner edge of each row includes a positive drive protrusion which extends away from the inner edge of each belt module, in use the positive drive protrusion of the conveyor belt engages the guiding surface of the shaft and is guided towards a leading side of the driving ridge, which allows the drive tower to drive the conveyor belt along the helical path.

The driving ridge and the shaft may project outwardly from the drive member away from the drive tower to allow the positive drive protrusion of the conveyor belt to engage the projecting shaft before being guided toward a leading side of the driving ridge.

The conveyor belt may be constructed from a plurality of interlinked rows of belt modules, each row having an inside edge located at the operative inside of the conveyor belt and an outer edge located at an operative outside of the conveyor belt. The positive drive protrusion may extend from the operative inside edge of the conveyor belt which, in use, is driven by the drive members which causes the conveyor belt to advance up or down along a helical path around the outer periphery of the rotating drive tower.

The positive drive protrusion of each belt module may be rounded which, in use, will facilitate the engagement of the positive drive protrusion with the projecting shaft and the movement from the shaft onto the driving ridge.

The positive drive protrusion may be bullet shaped, cylindrical or the like.

The positive drive spiral conveyor system may include a lead-in portion, where the conveyor belt approaches the drive tower such that the positive drive protrusion engages the projecting shaft of the drive member. The positive drive protrusion may then be guided by the shaft onto the driving ridge such that the conveyor belt starts to follow the helical path around the rotating drive tower while moving upward along the driving ridge.

The positive drive spiral conveyor may include a supporting frame which provides support for the belt at any one or more of the lead-in portion, lead-out portion, a return path or the helical path around the rotatable drive tower.

The positive drive spiral conveyor may either be in the form of an upward or downward spiral conveyor. The upward spiral conveyor may be configured with the lead-in portion located at a lower section of the drive tower, in use the conveyor belt may run from the lead-in portion along the helical path upward towards upper section of the drive tower.

The downward spiral conveyor may be configured with the lead-in portion located at an upper section of the drive tower, such that in use the conveyor belt may run from the lead-in portion along the helical path downward towards the lower part of the drive tower.

In one embodiment, the outer periphery of the drive tower may be cylindrical. In another embodiment, the diameter of the outer periphery of the drive tower may be varied in different sections along its length. In yet another embodiment the outer periphery of the drive tower may be tapered throughout its length. In such an embodiment, the drive tower may be substantially cone shaped.

In an upward spiral conveyor, the drive tower may have a larger peripheral diameter at the lower section and taper towards a smaller peripheral diameter at the upper section, such as to resemble a cone. In a downward spiral conveyor, the drive tower may have a larger peripheral diameter at the upper section and taper towards a smaller peripheral diameter at the lower section, such as to resemble an inverted cone. In use, in a spiral conveyor system, the conveyor belt tangentially moves towards the drive tower and engages the drive member either below or above the outwardly projecting shaft, for an upward or downward spiral conveyor respectively, allowing the conveyor belt to collapse on a larger diameter which in turn reduces the tension between each conveyor belt row. The conveyor belt thereafter moves towards the guiding surface of the outwardly projecting shaft where the reduced tension allows for movement between the conveyor belt rows which aids in the belt being either guided toward the leading side of the driving ridge such that it is driven by the drive tower or is guided towards a trailing side of the driving ridge where it does not engage the driving ridge.

In another embodiment, the outer periphery of the drive tower may be cylindrical, and the height of the driving ridges may be varied in different sections along its length. In yet another embodiment the height of the driving ridges may be varied throughout its length.

Broadly according to a another aspect of the invention there is provided a bar cap for use on a cage bar of a spiral conveyor system, which includes
    an body, having an interior shaped and dimensioned to fit over a cage bar of a drive tower;
    an outwardly projecting driving ridge extending in length along at least a section of an outer front face of the elongate body; and
    an outwardly projecting shaft, extending perpendicularly from the outer front face proximate an end of the driving ridge thereby defining an engagement zone, the outwardly projecting shaft defining a cylindrical guiding surface around the shaft, such that in use a positive drive protrusion of a conveyor belt engages the guiding surface of the projecting shaft and is guided towards a leading side of the driving ridge.

The outwardly projecting driving shaft may be positioned in-line, directly above or below the driving ridge.

In one embodiment of the invention the outwardly projecting shaft may be static or dynamic. In a preferred embodiment, the outwardly projecting shaft may be rigid and include a rolling element around the shaft. The rolling element may be in the form of a bearing, bush or the like. In one embodiment, the shaft may include a rolling element in the form of a bearing which is co-axially seated on an end of the projecting shaft, thereby reducing the friction between the projecting shaft and the positive drive protrusion when the positive drive protrusion is guided onto the driving ridge.

The body may include a lipped C-channel. The interior of the channel may be shaped and dimensioned to receive a cage bar. A front face of the body may be wider than the C-channel, providing laterally extending wings on the front face on either side of the C-channel.

The bar cap may be in the form of a primary bar cap which may be used with a secondary bar cap which are secured to a cage bar in line with each other to define a drive member.

With reference to an upward spiral conveyor, the primary bar cap may be positioned on a lower part of the cage bar and the secondary bar cap directly above, such that a top end of the primary bar cap abuts the lower end of the secondary cap.

In another embodiment, the bar cap may be in the form of a secondary bar cap that in use extends from top to bottom of a cage bar.

In accordance with yet a further embodiment of the invention there is provided a driving ridge cage bar kit for use on a cage bar of a spiral conveyor, which includes
    an primary bar cap as described above attachable to an upper or lower section of a cage bar; and
    a secondary bar cap having a driving ridge which extends along the length of front face of the secondary cap the secondary bar cap is attachable above or below, and in line with the primary bar cap, such that the driving ridges of the primary bar cap and secondary bar cap are contiguous.

The secondary cap may include a rear section which defines a holding formation shaped and dimensioned to be received by the cage bars.

The outer front face of the primary bar cap may have an increased width relative to the width of the secondary cap.

In use, the positive drive protrusion of a conveyor belt may engage the projecting shaft of the primary bar cap and be guided to either side of the driving ridge. The positive drive protrusion may move upward from the driving ridge of the primary bar cap towards the driving ridge of the secondary cap where the drive tower will continue to drive the conveyor belt due to the engagement between the driving ridge and the positive drive protrusion.

The invention is now described, by way of non-limiting example, with reference to the accompanying drawings:

BRIEF DESCRIPTION OF THE DRAWINGS

In the figure(s).

In the drawings, like reference numerals denote like parts of the invention unless otherwise indicated.

DETAILED DESCRIPTION

Figure 1:
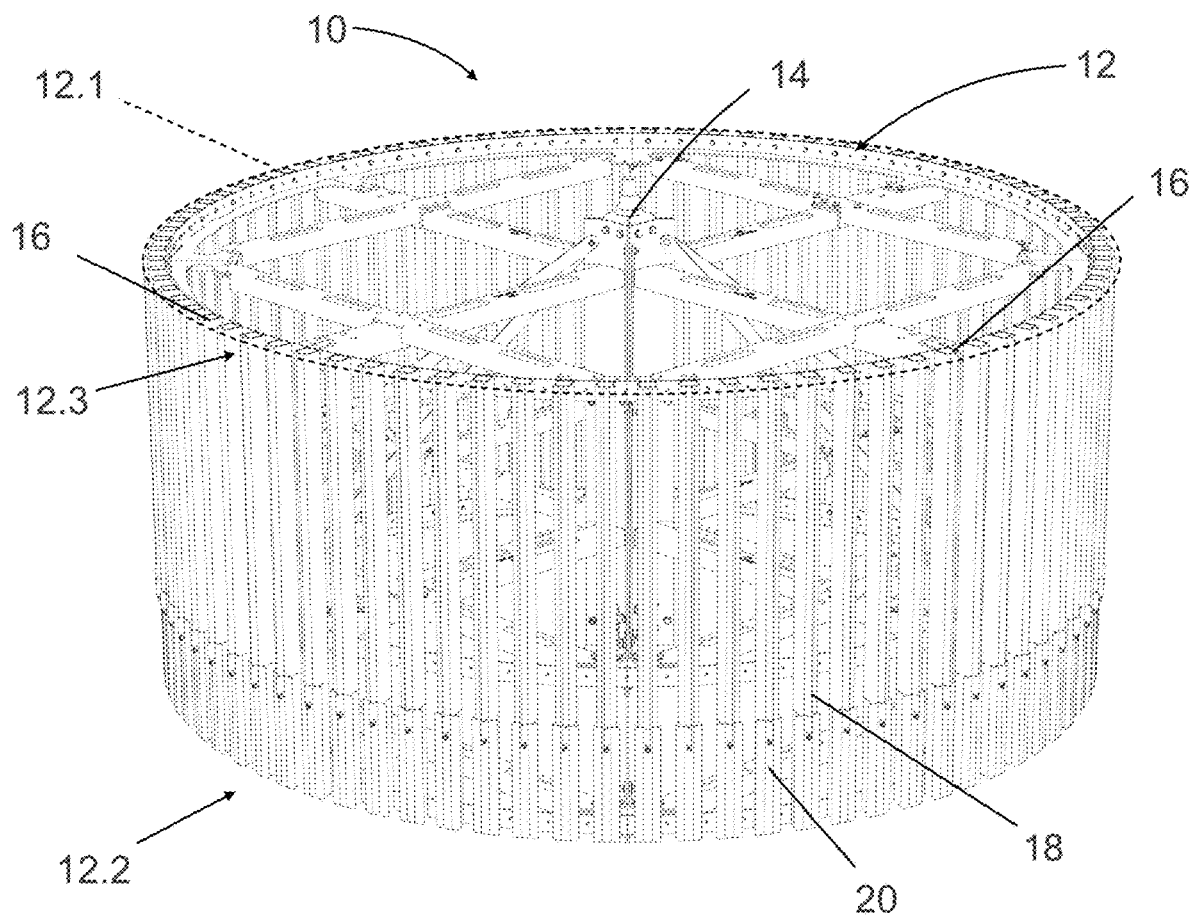
FIG. 1 shows one embodiment of an upward positive drive spiral conveyor in accordance with the invention.

In FIG. 1 reference numeral 10 refers to a positive drive spiral conveyor more specifically an upward positive drive spiral conveyor. The positive drive spiral conveyor 10 includes a drive tower 12 having an outer periphery 12.1 which rotates about a central point 14 when rotated by an electric motor (not shown. In this example the diameter of the drive tower 12 is constant along its length thereby defining a cylindrical drive tower. The drive tower 12 includes a plurality of radially spaced cage bars 16 which are secured to the outer periphery 12.1 of the drive tower. The plurality of cage bars 16 extend vertically from a bottom 12.2 to a top 12.3 of the drive tower 12. The positive drive spiral conveyor 10 includes a plurality of drive members 18,20 in the form of a secondary bar cap 18 and a primary bar cap 20 which are attached above and below one another to each cage bar 16.

Figure 2:
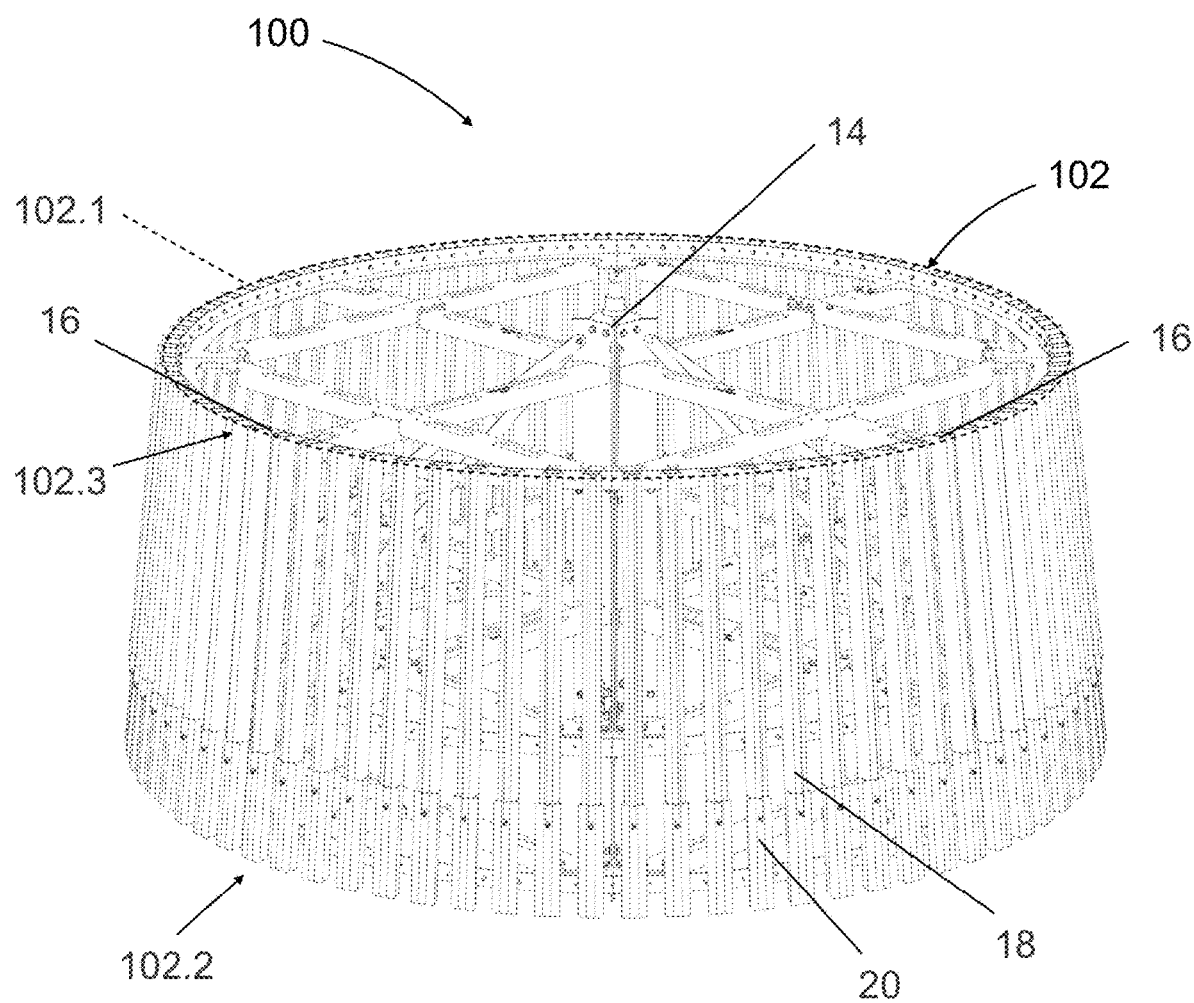
FIG. 2 shows another embodiment of an upward positive drive spiral conveyor in accordance with the invention.

In FIG. 2 reference numeral 100 refers to another example of an upward positive drive spiral conveyor. The positive drive spiral conveyor 100 includes a cone shaped drive tower 102. The diameter of the drive tower 102.1 reduces along its length such that the drive tower is cone shaped. The tension in the conveyor belt is reduced as a conveyor belt is driven upward towards a top of the drive tower 102.3 due to the reducing diameter of the drive tower. The drive tower 102 includes a plurality of radially spaced cage bars 16 which extend vertically from a bottom 102.2 to the top 102.3 of the drive tower and are secured to the outer periphery 102.1 of the drive tower.

The positive drive spiral conveyors 10, 100 as seen in FIG. 1 and FIG. 2 includes a plurality of drive members 18, 20 in the form of bar caps which are secured to the cage bars 16. Each drive member 18, 20 is defined by a secondary bar cap 18 and a primary bar cap 20 which are both attached to each cage bar 16 with the primary bar cap 20 positioned below the secondary bar cap 18. The secondary bar cap 18 includes a driving ridge 22 along the length of its front face 18.1. The primary bar cap 20 (see FIG. 6 and FIG. 7) includes a driving ridge 24 extending longitudinally partially along the primary bar cap's 20 front face 20.2 and an outwardly projecting shaft 26 which projects from the front face 20.2 of the primary bar cap directly below the driving ridge 24, where the positive drive protrusion 30 engages the primary bar cap 20 thereby defining a conveyor belt engagement zone 20.4

Figure 3:
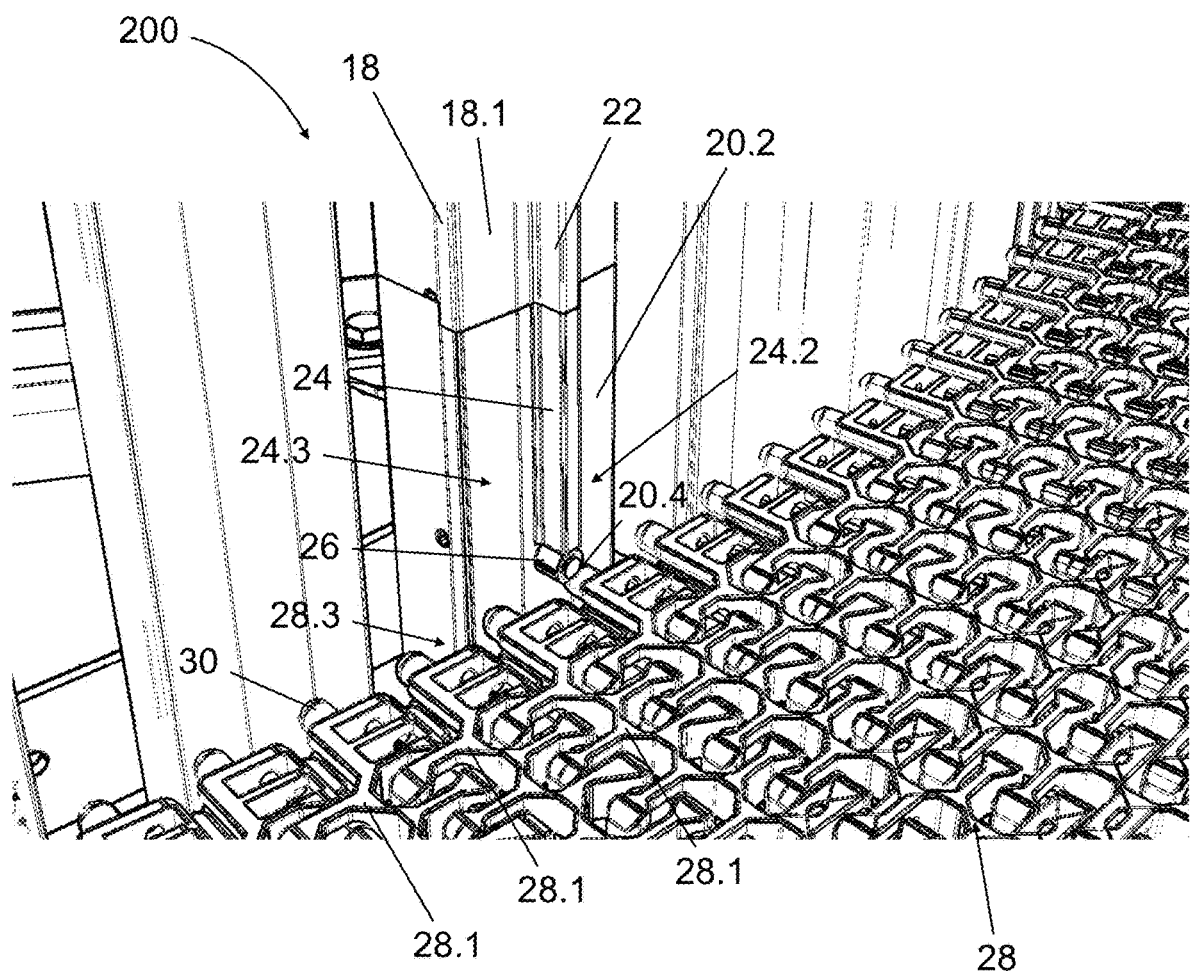
FIG. 3 shows a section of a positive drive spiral conveyor system, in accordance with a further aspect of the invention.
Figure 4:
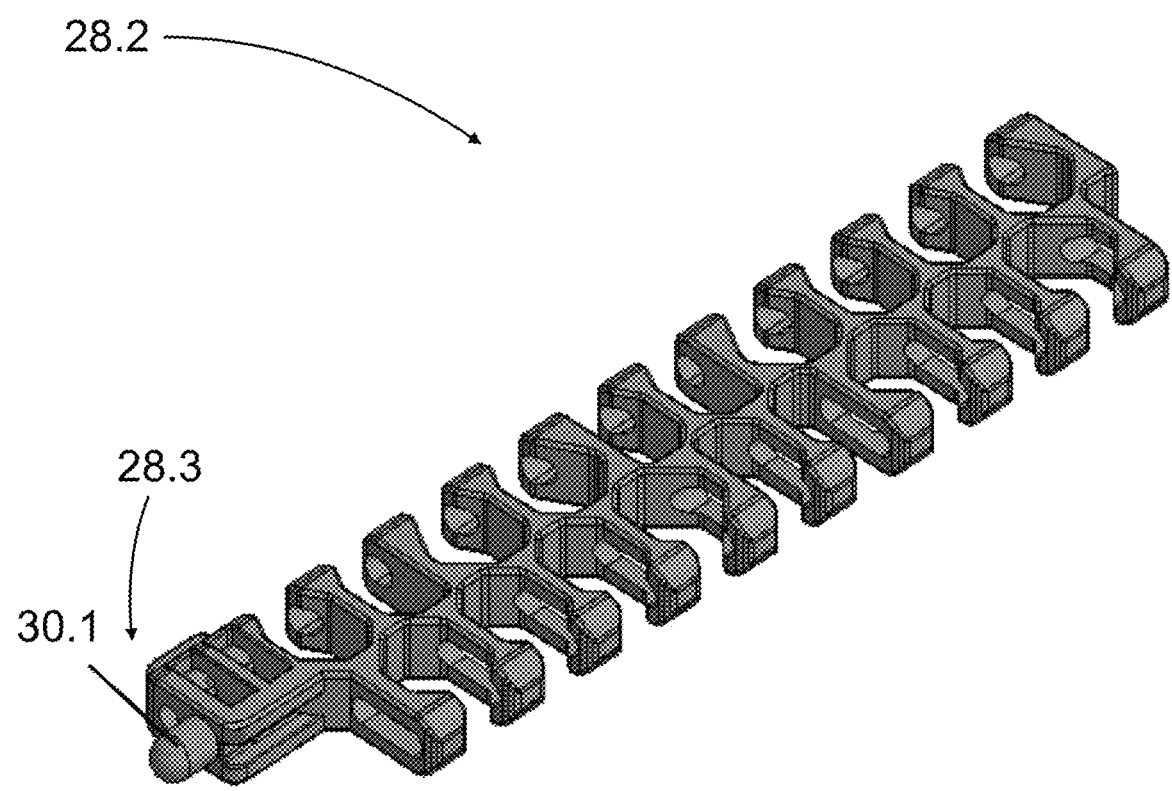
FIG. 4 shows a three-dimensional view of a belt module with a positive drive protrusion as used in the positive drive spiral conveyor system.

In FIG. 3 reference numeral 200 refers to a positive drive spiral conveyor system in accordance with a further aspect of the invention. The positive drive spiral conveyor system 200 includes the positive drive spiral conveyor 102 as shown in FIG. 2 and a conveyor belt 28 running on the positive drive spiral conveyor 100. The conveyor belt 28 is constructed from a plurality of rows 28.1 with each row 28.1 constructed from a plurality of belt modules 28.2. In FIG. 4 a belt module 28.2 which in use is positioned on an operative inside 28.3 of the conveyor belt is shown. The conveyor belt 28 includes a bullet shaped positive drive protrusion 30 which extends from the belt module 28.2 positioned on an operative inside 28.3 of the conveyor belt 28. It is to be appreciated that the positive drive protrusion 30 may be any shape which will allow engagement with the outwardly projecting shaft 26.

In use, the positive drive protrusion 30 of the conveyor belt 28 engages the primary bar cap 20 at the engagement zone 20.4 which is directly below the outwardly projecting shaft 26 allowing the conveyor belt 28 to collapse on a larger diameter which in turn reduces the tension between the conveyor belt rows 28.1. The reduced tension between the conveyor belt rows allows for movement between the rows 28.1 which aids in the positive drive protrusion 30 being guided towards the leading side 24.2 of the driving ridge 24 such that the conveyor belt 28 is driven by the drive tower 12 along the helical path as defined by a supporting frame (not shown) while the positive drive protrusion 30 moves upwardly along the driving ridge 24 of the primary bar cap 20 towards the driving ridge 22 of the secondary bar cap 18 and towards the top 12.3, 102, 3 of the drive tower 12, 100. The positive drive protrusion can also be guided towards a trailing side 24.3 of the driving ridge 24.

The secondary bar cap 18, as seen in FIGS. 1,2 and 3, has an elongated body with an interior section in the form of a lipped channel which is shaped and dimensioned to fit over the cage bar 16. The elongated body also has a front face 18.1 from which the driving ridge 22 extends in length along the secondary bar cap 18.

Figure 5:
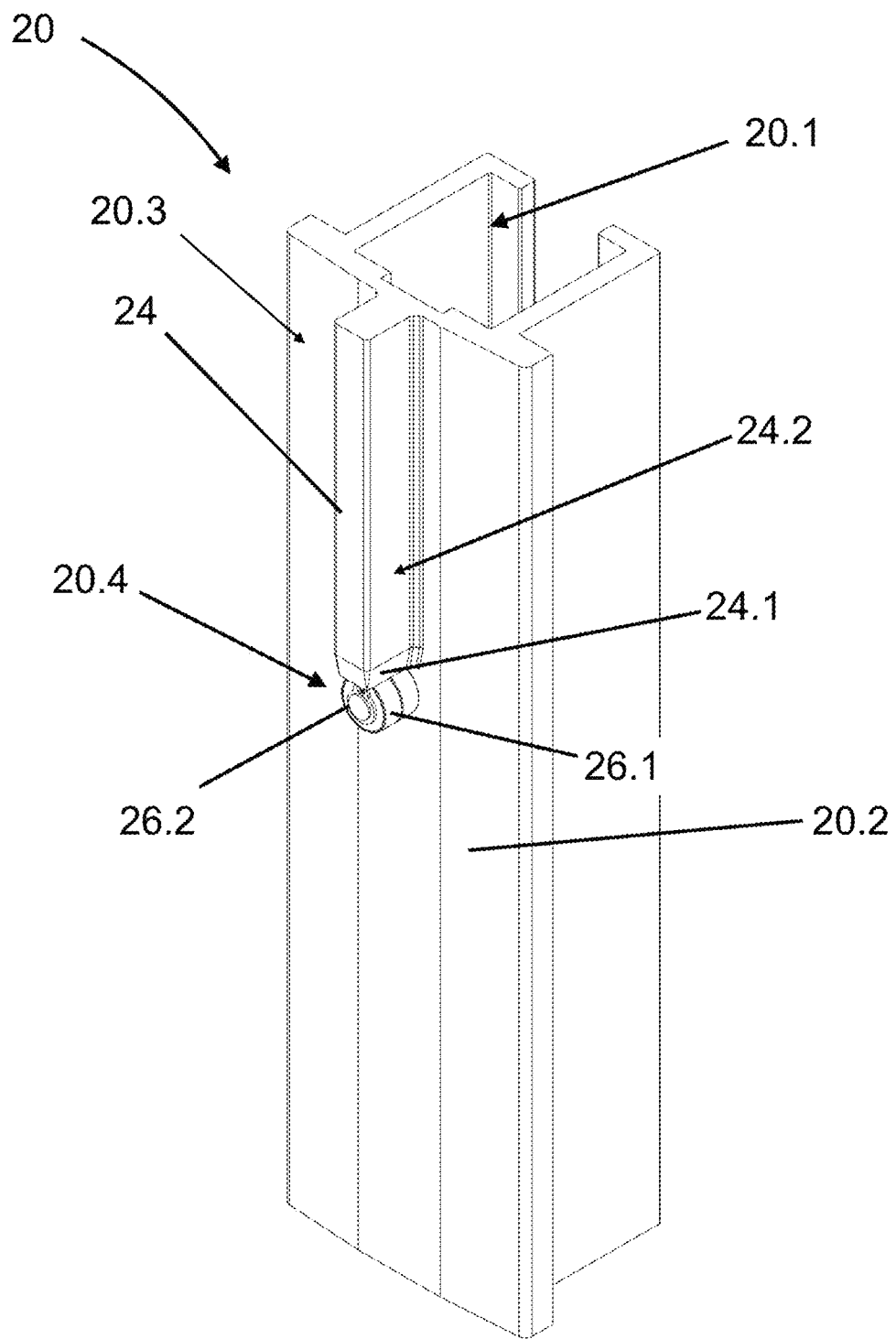
FIG. 5 shows a three-dimensional front view of an primary bar cap in accordance with yet a further embodiment of the invention.
Figure 6:
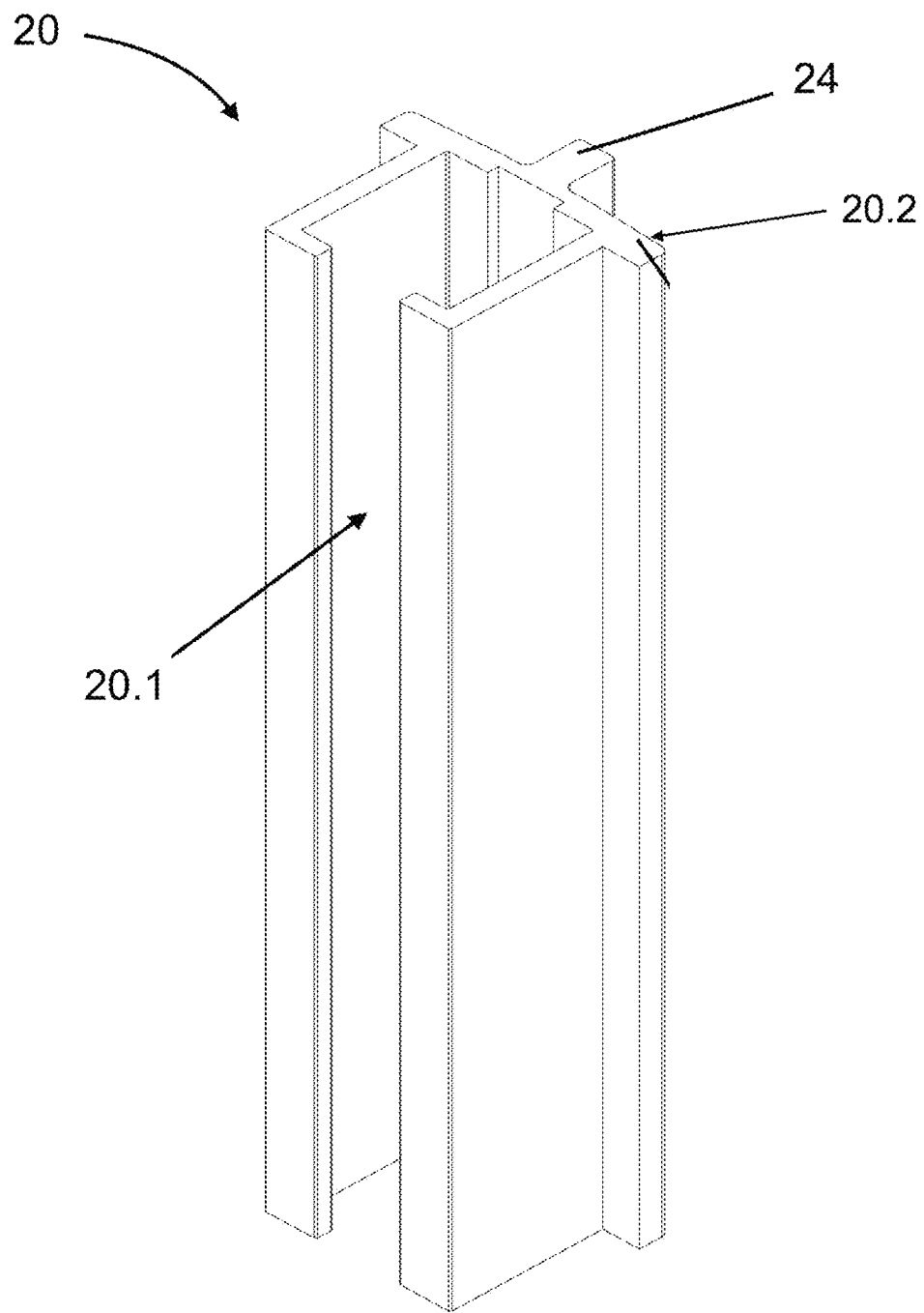
FIG. 6 shows a three-dimensional rear view of the primary bar cap as shown in FIG. 5.

With reference to FIG. 5 and FIG. 6 the primary bar cap 20 as seen in FIG. 1, FIG. 2 and FIG. 3 is shown. The primary bar cap 20 has an elongated body with an interior section 20.1, in the form of a lipped channel which is dimensioned to fit over the cage bar 16, and an front face 20.2 with an increased width relative to that of the interior section 20.1 and the front face 18.1 of the secondary bar cap 18. The increased width of the primary bar cap's front face 20.2 allows the positive drive protrusion 30 to engage the outwardly projecting shaft 26 with ease.

The outwardly projecting driving ridge 24 of the primary bar cap 20 extends in length along an upper section 20.3 of the front face 20.2 with a lower end 24.1 of the driving ridge 24.1 defining the conveyor engagement zone 20.4. The outwardly projecting shaft 26 also extends perpendicular from the front face 20.2 directly below the driving ridge 24 at the conveyor engagement zone 20.4. The outwardly projecting shaft 26 is rigid and includes a bearing 26.1, which is co-axially seated on an end of the projecting shaft 26, to reduce the friction between the projecting shaft 26 and the positive drive protrusion 30 of the conveyor belt 28. The outer cylindrical surface of the bearing 26.1 defines the guiding surface of the outwardly projecting shaft 26, which guides the positive drive protrusion 30 toward the leading side 24.2 of the driving ridge 24. The bearing 26.1 is kept in placed by a circlip 26.2 which is place in a groove not shown located on the end of the projecting shaft 26.

The inventor believes that the invention provides a positive drive conveyor belt which allows a smoother engagement between the positive drive protrusion of the conveyor belt and a drive member of the drive tower.

The invention claimed is:

1. A positive drive spiral conveyor, comprising:
   a drive tower rotatable about a vertical axis; and
   a plurality of drive members extending in length from a bottom to a top of the drive tower, the drive members spaced radially around the drive tower, each drive member having a projecting driving ridge extending in length along at least a section of each drive member with a projecting shaft positioned on each drive member proximate an end of the driving ridge thereby defining an engagement zone, the projecting shaft defining a guiding surface around the shaft, such that in use a positive drive protrusion of a conveyor belt engages the guiding surface of the projecting shaft and is guided towards a leading side of the driving ridge.

2. The positive drive spiral conveyor of claim 1, which includes a conveyor belt which in use is driven by the rotatable drive tower up or down along a helical path around the outer periphery drive tower.

3. The positive drive spiral conveyor of claim 2, in which the conveyor belt includes a plurality of rows of belt modules having an inside edge positioned to be at an operative inside of the helical path, the plurality of rows of belt modules having a positive drive protrusion which extends from the inside edge of each inner belt module such that in use the positive drive protrusion of the conveyor belt engages the guiding surface of the shaft and is guided towards the driving ridge, which allows the drive tower to drive the conveyor belt along the helical path around an outer periphery of the rotatable drive tower.

4. The positive drive spiral conveyor of claim 1, in which the projecting shaft is dynamic and capable of rotating relative the drive member.

5. The positive drive spiral conveyor of claim 1, in which the projecting shaft is static with a rolling element co-axially seated on the projecting shaft.

6. The positive drive spiral conveyor of claim 1, in which the drive tower includes a central driven member and a drum cage, in the form of a framed drum structure with a plurality of vertically extending radially spaced cage bars provided on the outer periphery of the drum cage, the drum cage rotatably attached to the central driven member.

7. The positive drive spiral conveyor of claim 1, in which the diameter of the outer periphery of the drive tower is tapered through the length of the drive tower such that the drive tower is substantially cone shaped.

8. The positive drive spiral conveyor of claim 6, in which each drive member is in the form of a single bar cap which are shaped and dimensioned to be secured to the cage bars.

9. The positive drive spiral conveyor of claim 8, in which the cage bar is in the form of a rectangular elongate member, the bar cap includes a holding formation on a rear of the bar cap which is shaped and dimension to allow the bar cap to slide over the cage bars.

10. The positive drive spiral conveyor of claim 8, in which each bar cap includes a front planar face shaped to have an increased width at the engagement zone relative the remainder of the bar cap, the driving ridge extending in length along at least a section of the front face with the shaft projecting substantially perpendicular away from the front face at the engagement zone.

11. The positive drive spiral conveyor of claim 6, in which each drive member is in the form of a primary bar cap and a secondary bar cap which are shaped and dimensioned to be secured in line with one another to a cage bar.

12. The positive drive spiral conveyor of claim 6, in which the primary bar cap includes a portion of the driving ridge which extends from one end partially along a length of a front face of the primary bar cap, the projecting shaft positioned proximate the driving ridge, the remainder of the driving ridge extending along the length of a front face of the secondary bar cap, the secondary bar cap and primary bar cap in use attachable in line with one another on a cage bar such that the driving ridge of the primary bar cap and secondary bar cap are contiguous.

13. The positive drive spiral conveyor of claim 1, in which the drive members are in the form of folded sheet members folded to define the driving ridge and the outwardly projecting shaft secured to the folded sheet members at the engagement zone.

14. The positive drive spiral conveyor of claim 13, in which the folded sheet members are attached to an outer periphery of the drive tower, the folded sheet members attached to an outer periphery of the drive tower at set distances to allow a required airflow through the drive tower.

\* \* \* \* \*